US012352733B2

(12) United States Patent
Beals et al.

(10) Patent No.: US 12,352,733 B2
(45) Date of Patent: Jul. 8, 2025

(54) MIXER FOR CHROMATOGRAPHY SYSTEM

(71) Applicant: Waters Technologies Corporation, Milford, MA (US)

(72) Inventors: Peyton C. Beals, Wrentham, MA (US); Sylvain Gilles Cormier, Mendon, MA (US); Richard Wayne Andrews, Rehoboth, MA (US)

(73) Assignee: Waters Technologies Corporation, Milford, MA (US)

( * ) Notice: Subject to any disclaimer, the term of this patent is extended or adjusted under 35 U.S.C. 154(b) by 119 days.

(21) Appl. No.: 17/993,392

(22) Filed: Nov. 23, 2022

(65) Prior Publication Data

US 2023/0083910 A1 Mar. 16, 2023

Related U.S. Application Data

(62) Division of application No. 16/988,942, filed on Aug. 10, 2020, now Pat. No. 11,555,805.
(Continued)

(51) Int. Cl.
*G01N 30/34* (2006.01)
*B01F 25/432* (2022.01)
*B01F 33/30* (2022.01)

(52) U.S. Cl.
CPC .......... *G01N 30/34* (2013.01); *B01F 25/432* (2022.01); *B01F 33/30* (2022.01); *G01N 2030/347* (2013.01)

(58) Field of Classification Search
CPC .... G01N 30/34; G01N 2030/347; B01F 33/30
See application file for complete search history.

(56) References Cited

U.S. PATENT DOCUMENTS 3,404,869 A * 10/1968 Harder ................ B01F 25/4323
366/338
3,583,678 A 6/1971 Harder
(Continued)

FOREIGN PATENT DOCUMENTS

| CN | 1537029 | 10/2004 |
| CN | 1964777 | 5/2007 |

(Continued)

OTHER PUBLICATIONS

"Appropriate Mixer Volume for HPLC and UHPLC Applications," Oct. 11, 2014. https://hplctips.blogspot.com/2014/10/appropriate-mixer-volume-for-hplc-and.html.
(Continued)

*Primary Examiner* — John Fitzgerald
(74) *Attorney, Agent, or Firm* — Schmeiser, Olsen & Watts LLP; William G. Guerin

(57) ABSTRACT

Described is a mixer for a chromatography system. The mixer includes an inlet manifold channel, an outlet manifold channel and a plurality of transfer channels. The inlet manifold channel has an inlet at a proximal end of the inlet manifold channel for receiving an inlet flow. The transfer channels are fluidly connected between the inlet and outlet manifold channels. The respective fluid connections are distributed along each of the inlet and outlet manifolds channels. The transfer channels have different volumes. The mixer may be formed of a plurality of layer and the layers may be diffusion bonded to each other.

14 Claims, 8 Drawing Sheets

Related U.S. Application Data

(60) Provisional application No. 62/885,617, filed on Aug. 12, 2019.

(56) References Cited

U.S. PATENT DOCUMENTS

| | | | |
|---|---|---|---|
| 3,595,531 A | 7/1971 | Williams et al. | |
| 3,830,369 A | 8/1974 | Pfadenhauer | |
| 3,857,551 A | 12/1974 | Troy | |
| 3,860,217 A | 1/1975 | Grout | |
| 3,886,073 A * | 5/1975 | Briltz | B01D 21/0006 |
| | | | 210/219 |
| 3,985,019 A | 10/1976 | Boehme et al. | |
| 4,198,168 A | 4/1980 | Penn | |
| 4,311,586 A | 1/1982 | Baldwin et al. | |
| 4,437,812 A | 3/1984 | Abu-Shumays et al. | |
| 4,496,245 A | 1/1985 | Conrad et al. | |
| 4,506,987 A | 3/1985 | Daughton et al. | |
| 4,534,659 A | 8/1985 | Dourdeville et al. | |
| 4,767,279 A | 8/1988 | Dourdeville et al. | |
| 4,842,730 A | 6/1989 | James et al. | |
| 4,882,062 A | 11/1989 | Moeller et al. | |
| 4,882,063 A | 11/1989 | Allington et al. | |
| 4,954,253 A | 9/1990 | Alexandrov et al. | |
| 4,971,450 A | 11/1990 | Gerich | |
| 5,275,723 A | 1/1994 | Greenley et al. | |
| 5,304,487 A | 4/1994 | Wilding et al. | |
| 5,423,661 A | 6/1995 | Gabeler et al. | |
| 5,486,335 A | 1/1996 | Wilding et al. | |
| 5,637,469 A | 6/1997 | Wilding et al. | |
| 5,656,034 A | 8/1997 | Kochersperger et al. | |
| 5,664,938 A | 9/1997 | Yang | |
| 5,738,783 A | 4/1998 | Shirota et al. | |
| 5,846,411 A | 12/1998 | Harter et al. | |
| 5,887,977 A | 3/1999 | Morikawa | |
| 5,904,424 A | 5/1999 | Schwesinger et al. | |
| 5,918,976 A | 7/1999 | Hashimoto et al. | |
| 6,048,496 A | 4/2000 | Zhou et al. | |
| 6,170,981 B1 | 1/2001 | Regnier et al. | |
| 6,190,034 B1 | 2/2001 | Nielsen et al. | |
| 6,296,020 B1 | 10/2001 | McNeely et al. | |
| 6,319,469 B1 | 11/2001 | Mian et al. | |
| 6,629,775 B2 | 10/2003 | Choikhet et al. | |
| 6,637,463 B1 | 10/2003 | Lei et al. | |
| 6,705,357 B2 | 3/2004 | Jeon et al. | |
| 6,843,262 B2 | 1/2005 | Ismagilov et al. | |
| 6,845,787 B2 | 1/2005 | Karp et al. | |
| 6,851,846 B2 | 2/2005 | Fujii et al. | |
| 6,883,559 B2 | 4/2005 | Jeon et al. | |
| 6,887,384 B1 | 5/2005 | Frechet et al. | |
| 6,890,093 B2 | 5/2005 | Karp et al. | |
| 6,893,547 B2 | 5/2005 | Gascoyne et al. | |
| 6,916,113 B2 | 7/2005 | Van de Goor et al. | |
| 6,919,046 B2 | 7/2005 | O'Connor et al. | |
| 6,942,792 B2 | 9/2005 | Aso | |
| 6,958,119 B2 | 10/2005 | Mn et al. | |
| 6,981,522 B2 | 1/2006 | O'Connor et al. | |
| 6,987,263 B2 | 1/2006 | Hobbs et al. | |
| 6,991,729 B2 | 1/2006 | Keda et al. | |
| 7,105,304 B1 | 9/2006 | Nikiforov et al. | |
| 7,111,501 B2 | 9/2006 | Rocklin et al. | |
| 7,112,277 B2 | 9/2006 | Bidlingmeyer et al. | |
| 7,134,453 B2 | 11/2006 | Peters et al. | |
| 7,143,785 B2 | 12/2006 | Maerkl et al. | |
| 7,147,364 B2 | 12/2006 | Oohashi et al. | |
| 7,178,386 B1 | 2/2007 | Gamble et al. | |
| 7,204,139 B2 | 4/2007 | Takayama | |
| 7,207,345 B2 | 4/2007 | Somerville | |
| 7,241,423 B2 | 7/2007 | Golbig et al. | |
| 7,261,812 B1 | 8/2007 | Karp et al. | |
| 7,278,329 B2 | 10/2007 | Weissgerber et al. | |
| 7,314,070 B2 | 1/2008 | Jeon et al. | |
| 7,390,121 B2 | 6/2008 | Jahn et al. | |
| 7,731,907 B2 | 6/2010 | Ballhorn et al. | |
| 7,744,762 B2 | 6/2010 | Lazar | |
| 7,887,753 B2 | 2/2011 | Quake et al. | |
| 7,976,779 B2 | 7/2011 | Tai et al. | |
| 8,122,909 B2 * | 2/2012 | Tonkovich | B01J 19/0093 |
| | | | 137/833 |
| 8,329,358 B2 * | 12/2012 | Peng | H01M 8/1007 |
| | | | 429/514 |
| 8,329,407 B2 | 12/2012 | Ismagilov et al. | |
| 8,511,889 B2 | 8/2013 | Choikhet et al. | |
| 8,696,193 B2 | 4/2014 | Herbstritt | |
| 8,764,279 B2 | 7/2014 | Castro et al. | |
| 8,979,358 B2 | 3/2015 | Wiechers | |
| 9,128,071 B2 | 9/2015 | Tsukada et al. | |
| 9,409,170 B2 * | 8/2016 | Govyadinov | B01F 25/27 |
| 9,527,010 B2 | 12/2016 | Williams et al. | |
| 9,528,968 B2 | 12/2016 | Murphy et al. | |
| 9,557,317 B2 | 1/2017 | Ozbal | |
| 9,566,537 B2 | 2/2017 | Geng | |
| 9,636,646 B2 | 5/2017 | Neerincx et al. | |
| 9,679,757 B2 | 6/2017 | Netto et al. | |
| 9,766,217 B2 | 9/2017 | Kidal et al. | |
| 9,791,107 B2 | 10/2017 | Witt et al. | |
| 9,884,266 B2 | 2/2018 | Dauphas et al. | |
| 9,945,820 B2 | 4/2018 | Albrecht, Jr. | |
| 9,968,894 B2 | 5/2018 | Shreve | |
| 9,970,908 B2 | 5/2018 | Yotani et al. | |
| 9,987,604 B2 | 6/2018 | Baaske et al. | |
| 10,052,628 B2 | 8/2018 | Glazier et al. | |
| 10,088,459 B2 | 10/2018 | Onoda et al. | |
| 10,238,989 B2 | 3/2019 | Luongo et al. | |
| 10,247,673 B2 | 4/2019 | Peterman et al. | |
| 10,295,512 B2 | 5/2019 | Pohl et al. | |
| 10,335,753 B2 | 7/2019 | De Corral et al. | |
| 2002/0113095 A1 | 8/2002 | Jeon et al. | |
| 2002/0134143 A1 | 9/2002 | Allington et al. | |
| 2003/0077204 A1 | 4/2003 | Seki et al. | |
| 2003/0123322 A1 | 7/2003 | Chung et al. | |
| 2004/0011413 A1 | 1/2004 | Fujii et al. | |
| 2004/0092033 A1 | 5/2004 | Gustafson et al. | |
| 2004/0096867 A1 | 5/2004 | Andersson et al. | |
| 2004/0109793 A1 | 6/2004 | McNeely et al. | |
| 2005/0118070 A1 | 6/2005 | Griss et al. | |
| 2005/0252840 A1 | 11/2005 | Arnold et al. | |
| 2006/0039829 A1 | 2/2006 | Suk et al. | |
| 2006/0171864 A1 | 8/2006 | Caze et al. | |
| 2006/0273012 A1 | 12/2006 | Dehmer | |
| 2006/0280029 A1 | 12/2006 | Garstecki et al. | |
| 2006/0285433 A1 | 12/2006 | Yang et al. | |
| 2007/0113907 A1 | 5/2007 | Brennen et al. | |
| 2007/0148048 A1 | 6/2007 | Jousse | |
| 2007/0177458 A1 | 8/2007 | Meiners et al. | |
| 2007/0178359 A1 * | 8/2007 | Peng | H01M 8/2484 |
| | | | 428/167 |
| 2007/0207363 A1 * | 9/2007 | Chyou | H01M 8/0271 |
| | | | 429/513 |
| 2007/0240989 A1 | 10/2007 | Levitan et al. | |
| 2007/0256736 A1 | 11/2007 | Tonkovich et al. | |
| 2007/0263477 A1 | 11/2007 | Sudarsan et al. | |
| 2007/0269894 A1 | 11/2007 | Howland et al. | |
| 2007/0297285 A1 | 12/2007 | Cross et al. | |
| 2008/0043570 A1 | 2/2008 | Arnold et al. | |
| 2009/0044619 A1 | 2/2009 | Fiering et al. | |
| 2009/0142846 A1 | 6/2009 | Crenshaw et al. | |
| 2009/0148858 A1 | 6/2009 | Patel et al. | |
| 2009/0207687 A1 | 8/2009 | Kemperman et al. | |
| 2009/0213686 A1 * | 8/2009 | Heikkilae | B01F 25/64 |
| | | | 415/203 |
| 2009/0255601 A1 | 10/2009 | Baeuerle et al. | |
| 2009/0268548 A1 | 10/2009 | Hartmann et al. | |
| 2010/0040483 A1 | 2/2010 | Berger et al. | |
| 2010/0078086 A1 | 4/2010 | Guidat et al. | |
| 2010/0159573 A1 | 6/2010 | Chung et al. | |
| 2010/0189602 A1 | 7/2010 | Baeuerle et al. | |
| 2011/0113866 A1 | 5/2011 | Finlay | |
| 2011/0192217 A1 | 8/2011 | Choikhet et al. | |
| 2012/0145256 A1 * | 6/2012 | Van Noort | B01F 33/30 |
| | | | 137/88 |
| 2012/0208265 A1 * | 8/2012 | Partsch | F28D 9/0043 |
| | | | 429/81 |
| 2012/0269027 A1 | 10/2012 | Xia et al. | |

(56) References Cited

U.S. PATENT DOCUMENTS

| | | | |
|---|---|---|---|
| 2012/0309648 | A1 | 12/2012 | Tseng et al. |
| 2014/0061133 | A1 | 3/2014 | Herman |
| 2014/0230528 | A1 | 8/2014 | Wang et al. |
| 2014/0241110 | A1 | 8/2014 | Igata |
| 2014/0334251 | A1 | 11/2014 | Shreve |
| 2014/0345372 | A1 | 11/2014 | Gerhardt et al. |
| 2014/0377145 | A1* | 12/2014 | Govyadinov ......... B01F 25/50 422/505 |
| 2015/0265978 | A1 | 9/2015 | Barciela et al. |
| 2016/0011328 | A1 | 1/2016 | Jones et al. |
| 2016/0161454 | A1 | 6/2016 | Jones et al. |
| 2016/0250606 | A1 | 9/2016 | Nasman |
| 2016/0266078 | A1 | 9/2016 | Onoda et al. |
| 2017/0173496 | A1 | 6/2017 | Stone |
| 2017/0216786 | A1* | 8/2017 | Mochizuki ......... B01F 27/111 |
| 2017/0333898 | A1 | 11/2017 | Saleh et al. |
| 2018/0056252 | A1 | 3/2018 | Steele et al. |
| 2018/0088091 | A1 | 3/2018 | Cormier et al. |
| 2019/0070571 | A1 | 3/2019 | Jackson et al. |
| 2019/0070572 | A1 | 3/2019 | MacKinnon et al. |
| 2019/0170706 | A1 | 6/2019 | Gilar et al. |
| 2019/0265206 | A1 | 8/2019 | Tarafder |
| 2019/0383777 | A1 | 12/2019 | Inoue |
| 2020/0023295 | A1 | 1/2020 | Moeller et al. |
| 2020/0025723 | A1 | 1/2020 | Gilar et al. |
| 2020/0276728 | A1 | 9/2020 | Zeko et al. |

FOREIGN PATENT DOCUMENTS

| | | | |
|---|---|---|---|
| CN | 101370433 | A | 2/2009 |
| CN | 102686321 | A | 9/2012 |
| CN | 203061073 | U | 7/2013 |
| CN | 203385703 | U | 1/2014 |
| CN | 101920183 | B * | 6/2014 |
| CN | 103949170 | A | 7/2014 |
| CN | 102958588 | B * | 1/2015 ......... B01F 13/0059 |
| CN | 204116295 | U | 1/2015 |
| CN | 104948351 | | 9/2015 |
| CN | 106166453 | | 11/2016 |
| CN | 106422832 | | 6/2017 |
| CN | 106902662 | | 6/2017 |
| CN | 104076112 | B | 9/2018 |
| CN | 109173766 | | 1/2019 |
| CN | 209333548 | U | 9/2019 |
| CN | 110394105 | | 11/2019 |
| DE | 19511603 | | 10/1996 |
| DE | 19902697 | | 7/2000 |
| DE | 102015100693 | A1 | 7/2016 |
| DE | 102018104840 | A1 | 4/2018 |
| EP | 1174179 | | 1/2002 |
| EP | 1193496 | | 4/2002 |
| EP | 1243314 | | 9/2002 |
| EP | 1566215 | | 8/2005 |
| EP | 1788388 | | 5/2007 |
| EP | 2106846 | A1 | 10/2009 |
| FR | 3075068 | A1 | 6/2019 |
| JP | 5191175 | A | 8/1976 |
| JP | S51102252 | A | 9/1976 |
| JP | S5592130 | A | 7/1980 |
| JP | S55159831 | A | 12/1980 |
| JP | 6248428 | U | 3/1987 |
| JP | S6295727 | U | 6/1987 |
| JP | S62210042 | A | 9/1987 |
| JP | H02167469 | A | 6/1990 |
| JP | H06324026 | A | 11/1994 |
| JP | H07159388 | A | 6/1995 |
| JP | 2587162 | Y2 | 12/1998 |
| JP | H02170047 | A | 6/1999 |
| JP | 2603770 | Y2 | 3/2000 |
| JP | 3665680 | B2 | 6/2005 |
| JP | 2005211857 | A | 8/2005 |
| JP | 2006003203 | A | 1/2006 |
| JP | 3780917 | B2 | 5/2006 |
| JP | 2006122735 | A | 5/2006 |
| JP | 2006281008 | A | 10/2006 |
| JP | 3865119 | B2 | 1/2007 |
| JP | 2007090262 | A | 4/2007 |
| JP | 3959436 | B2 | 8/2007 |
| JP | 4043718 | B2 | 2/2008 |
| JP | 4082309 | B2 | 4/2008 |
| JP | 2009018311 | A | 1/2009 |
| JP | 2009208052 | A | 9/2009 |
| JP | 4348820 | B2 | 10/2009 |
| JP | 4360206 | B2 | 11/2009 |
| JP | 2010082533 | A | 4/2010 |
| JP | 4683066 | B2 | 5/2011 |
| JP | 5427603 | B2 | 2/2014 |
| KR | 20020085903 | | 11/2002 |
| KR | 20040069496 | | 8/2004 |
| KR | 100666500 | B1 | 1/2007 |
| KR | 101736797 | B1 | 5/2017 |
| KR | 102014601 | B1 | 8/2019 |
| NL | 2006787 | C | 11/2012 |
| WO | 1997000125 | | 1/1997 |
| WO | 0022436 | A1 | 4/2000 |
| WO | 2003015890 | | 2/2003 |
| WO | 2003024598 | | 3/2003 |
| WO | 2003047736 | | 6/2003 |
| WO | 2003098218 | | 11/2003 |
| WO | 2005063368 | A3 | 7/2005 |
| WO | 2006017039 | A1 | 2/2006 |
| WO | 2007021755 | A2 | 2/2007 |
| WO | 2010015238 | A1 | 2/2010 |
| WO | 2010022428 | A1 | 3/2010 |
| WO | 2010030720 | A1 | 3/2010 |
| WO | 2010107677 | A1 | 3/2010 |
| WO | 2010083884 | A1 | 7/2010 |
| WO | 2011003412 | A2 | 1/2011 |
| WO | 2011158430 | A1 | 12/2011 |
| WO | 2012166756 | A1 | 12/2012 |
| WO | WO-2013090141 | A1 * | 6/2013 ......... B01F 13/0059 |
| WO | 2013187916 | A1 | 12/2013 |
| WO | 2014034259 | A1 | 3/2014 |
| WO | 2016082520 | A1 | 6/2016 |
| WO | 2018226907 | A2 | 12/2018 |
| WO | 2019086671 | A1 | 5/2019 |
| WO | 2019097490 | A1 | 5/2019 |
| WO | 2019167011 | A1 | 9/2019 |
| WO | 2019168970 | A1 | 9/2019 |
| WO | 2019186223 | A1 | 10/2019 |
| WO | 2019204508 | A1 | 10/2019 |
| WO | 2019229819 | A1 | 12/2019 |
| WO | 2019240653 | A1 | 12/2019 |
| WO | 2020099865 | A1 | 5/2020 |

OTHER PUBLICATIONS

"Dynamic Mixing Chamber Manual V.7119-1," Knauer, Berlin, Germany, Aug. 2016.
"HPLC Gradient Mixers," Mott, 2020. https://mottcorp.com/product/mixers/hplc-gradient-static-mixers/.
"HyperShear(TM) HPLC and UHPLC Mixers" 2014, Analytical Scientific Instruments US, Inc.
"Reliable Solvent Mixing in UHPLC," Thermo Fisher Scientific, Inc., 2016.
"Varian Dual Chamber Dynamic Mixer Instruction Manual," Varian, Publication No. 0391467400, Issue 5, Feb. 2009.
Chen, et al. "Combining selection valve and mixing chamber for nanoflow gradient generation: Toward developing a liquid chromatography cartridge coupled with mass spectrometer for protein and peptide analysis." Analytica Chimica Acta 887 (2015) pp. 230-236.
Chisolm, et al. "Development and characterization of 'push-pull' sampling device with fast reaction quenching coupled to high-performance liquid chromatography for pharmaceutical process analytical technologies," Journal of Chromatography A 1217 (2010) 7471-7477.
Davis, et al. "A Sample, Reliable Rapid-Mixing Apparatus for Continuous-Flow Studies," Analytical Biochemistry 97 (1979) pp. 428-437.
Engelhardt, Heinz and Helmut Elgass, "Problems in the application of gradient elution to high-pressure liquid chromatography," Journal of Chromatography 112 (1975) pp. 415-423.

(56) References Cited

OTHER PUBLICATIONS

Gilbert, Scott "Lab-on-a-chip miniaturized on-line liquid chromatography," Crystal Vision Microsystems, CPAC Satellite Workshop, Rome, Italy, Mar. 20-22, 2006.

Huft, et al. "Microfluidic Integration of Paralell Solid-Phase Liquid Chromatography," Analytical Chemistry 85 (2013) 2999-3005.

Ianovska, et al. "Development of small-vol. microfluidic chaotic mixers for future application in two-dimensional liquid chromatography," RSC Adv., 2017, 7, pp. 9090-9099.

Kaminski, et al. "Programming the Elution Gradient in High-Performance Chromatography by Varying the Volume of the Mixing Chambers," Journal of Chromatography 176 (1979) pp. 171-180.

Kostanyan, Artak E. and Andrei A. Voshkin, "Support-free pulsedliquid-liquid chromatogrpahy," Journal of Chromatography A 1216 (2009) pp. 7761-7766.

Lawati, et al. "Combination of capillary micellar liquid chromatography with on-chip microfluidic chemiluminescence detection for direct analysis of buspirone in human plasma," Talanta 127 (2014) pp. 230-238.

Qian, Shizhi and Haim H. Bau, "Magneto-hydrodynamics based microfluidics," Mechanics Research Communications 36 (2009) 10-21.

Shi, et al., "Mixing enhancement via a serpentine micromixer for real-time activation of carboxyl," Chemical Engineering Journal, 2019. https://doi.org/10.1016/j.cej.2019.123642.

Steele, et al. "Reducing HPLC/UHPLC System Noise and Volume with High Performance Static Mixers," Feb. 26, 2017, Mott Corporation.

Takeuchi, Toyohide and Daido Ishii, "Continuous Gradient Elution in Micro High-Performance Liquid Chromatography," Journal of Chromatography 253 (1982) pp. 41-47.

Wang, et al. "On-line two-dimensional countercurrent chromatography x high performance liquid chromatography system with a novel fragmentarydilution and turbulent mixing interface for preparation of coumarinsfrom Cnidium monnieri" Journal of Chromatography A, 1406 (2015) pp. 215-223.

Restriction Requirement in U.S. Appl. No. 16/988,942 mailed on Jun. 14, 2022.

Non-Final Office Action in U.S. Appl. No. 16/988,942 mailed on Aug. 4, 2022.

Notice of Allowance in U.S. Appl. No. 16/988,942 mailed on Oct. 27, 2022.

International Search Report and Written Opinion in PCT/US2020/045581 mailed on Nov. 11, 2020.

International Preliminary Report on Patentability in PCT/US2020/045581 mailed on Feb. 24, 2022.

Notice of Allowance in U.S. Appl. No. 16/111,733 mailed on Sep. 9, 2021.

Restriction/Election Requirement in U.S. Appl. No. 16/111,699, mailed on Jan. 21, 2021; 8 pages.

Nguyen, Nam-Trung and Steven T. Wereley, "Fundamentals and Applications of Microfluidics, Second Edition," 2006, Artech House, Inc., p. 380.

Invitation to Pay Additional Fees and Partial International Search in PCT/US2018/047899 mailed on Nov. 13, 2018; 16 pages.

International Preliminary Report on Patentability in PCT/US2018/047899 mailed on Mar. 19, 2020.

International Search Report & Written Opinion in PCT/US2018/047899 mailed on Jan. 10, 2019; 22 pages.

Final Office Action in U.S. Appl. No. 16/111,733, mailed on Jan. 13, 2021; 10 pages.

Non-Final Office Action in U.S. Appl. No. 16/111,733 mailed on Aug. 31, 2020.

Invitation to Pay Additional Fees and Partial Search Report in PCT/US2018/047904 mailed on Feb. 15, 2019; 15 pages.

International Preliminary Report on Patentability in PCT/US2018/047904 mailed on Mar. 19, 2020.

International Search Report and Written Opinion in PCT/US2018/047904 mailed on Apr. 5, 2019; 21 pages.

Jeon, et al., "Generation of Solution and Surface Gradients Using Microfluidic Systems," Langmuir 2000, vol. 16, No. 22, pp. 8311-8316.

Examination Report in European Patent Application No. 18765324.1 mailed on May 11, 2021.

Non-Final Office Action in U.S. Appl. No. 16/111,733 mailed on Apr. 30, 2021.

Non-Final Office Action in U.S. Appl. No. 16/111,699 mailed on Jun. 1, 2021.

\* cited by examiner

MIXER FOR CHROMATOGRAPHY SYSTEM

RELATED APPLICATION

This application is a division of U.S. patent application Ser. No. 16/988,942 filed on Aug. 10, 2020, and titled "Mixer for Chromatography System," which claims the benefit of the earlier filing date of U.S. Provisional Patent Application Ser. No. 62/885,617 filed Aug. 12, 2019 and titled "A Mixer," the entireties of which are incorporated herein by reference.

FIELD OF INVENTION

The invention relates generally to a mixer. More specifically, the invention relates to a mixer for use in the calibration of a chromatography system, and to a calibration device incorporating the mixer.

BACKGROUND

Chromatography is a set of techniques for separating a mixture into its constituents. Generally, in a liquid chromatography analysis, a pump takes in and delivers a composition of liquid solvents at high pressure to a sample manager, where a sample (i.e., material under analysis) awaits injection into the mixture. From the sample manager, the resulting composition comprised of the mixture of liquid solvents and injected sample moves to a point of use, such as a chromatography column filled with stationary phase. By passing the composition through the column, the various components in the sample separate from each other at different rates and thus elute from the column at different times. A detector receives the elution from the column and produces an output from which the identity and quantity of the analytes may be determined.

There is a requirement to periodically qualify the components of the chromatography apparatus (and to recalibrate and requalify the components as necessary). A known method of qualification is Systems Qualification Technology (SystemsQT), provided by Waters Corporation, MA, USA, which allows a user to conduct Installation Qualification (IQ), Operational Qualification (OQ), system performance testing and data management.

Known qualification methods use a chromatographic column to measure the chromatography system's performance. This exploits chromatographic data processing and regression analysis to substantially automate the collection and qualification of test results. A key benefit of using a chromatographic column is predictable control of the shape of the peaks used for the qualification measurements. Moreover, it is beneficial to qualify an instrument using all the same components that will be used during an analysis.

A problem with using a chromatographic column is that a user must wait for the column to equilibrate before qualification can reliably be performed, to fully flush through any fluids from previous analyses and/or to reach thermal stability. Existing qualification methods can take between 3 to 24 hours, which is undesirable because the instrument will be unusable during that time.

Further, no two chromatographic columns may be the same, even when made to substantially the same specifications. For example, there may be variations in the way in which the stationary phase has been packed in the column, causing the chromatographic columns to exhibit different behaviour during an analysis, which undermines the accuracy of the qualification.

It has been proposed to replace the column with tubing during the qualification, which is connected to the detector. However, the use of tubing does not afford any control of the peak shape and there is no separation. Also, the tubing may not itself provide a suitable back-pressure to apply a load to the system.

There is a need to ensure that the solvent(s) and sample entering the column/tubing are a substantially homogenous composition. The known use of tubing during qualification does not allow any mixing of the composition.

U.S. Pat. No. 8,511,889 discloses a mixer which seeks to output a substantially mixed composition. The mixer comprises a plurality of flow channels. Each flow channel comprises a first flow section, offering a hydraulic resistance. A fluid distributor provides for the simultaneous arrival of a fluid at all of the first flow sections, which are disclosed as being of the same length and cross section, so that each first flow section has the same hydraulic resistance. There is a second flow section downstream of the first flow section, which acts to mix the composition conveyed within the respective second flow section. The second flow sections are of differing volumes to delay fluid propagation to a corresponding extent. All the second flow sections combine at a single point (the flow combiner).

A problem with the mixer of U.S. Pat. No. 8,511,889 is that whilst it may promote mixing of the fluid being conveyed within each flow channel, the operation of the single flow distributer may not adequately distribute the fluid into the first flow sections. Accordingly, although some smoothing of any compositional variations may be carried out a local level within each flow channel, any compositional variations over the fluid flow as a whole will still be present when the flow channels are recombined.

The present invention seeks to address at least some of the aforementioned problems.

SUMMARY

In one aspect, a mixer includes an inlet manifold channel, an outlet manifold channel and a plurality of transfer channels. The inlet manifold channel has an inlet at a proximal end of the inlet manifold channel for receiving an inlet flow. The plurality of transfer channels is fluidly connected between the inlet and outlet manifold channels. The respective fluid connections are distributed along each of the inlet and outlet manifolds channels and the transfer channels have different volumes.

The respective fluid connections may be distributed substantially equally along the length of the inlet and outlet manifolds.

The plurality of transfer channels may extend substantially within the same plane from the inlet and outlet manifold channels at each fluid connection. The transfer channels may be arranged in substantially the same plane. The plurality of transfer channels may include a flow restrictor.

The outlet manifold channel may have an outlet at a distal end of the outlet manifold channel for delivering an outlet flow and the proximal end of the outlet manifold channel may be arranged adjacent the distal end of the inlet manifold channel.

The fluid connection of a first one of the transfer channels to the inlet manifold channel may be adjacent the proximal end of the inlet manifold channel and the fluid connection of the first one of the transfer channels to the outlet manifold channel may be adjacent the distal end of the outlet manifold channel. The fluid connection of a last one of the transfer channels to the inlet manifold channel is adjacent the distal end of the inlet manifold channel and the fluid connection of the last one of the transfer channels to the outlet manifold channel is adjacent the proximal end of the outlet manifold channel.

A restrictor may be fluidly connected to the mixer. The restrictor may be downstream of the outlet manifold. The mixer may be formed of a plurality of layers. The layers may be diffusion bonded to each other and may be formed of titanium. The mixer may be provided in, by or adjacent one of the layers and the restrictor is provided in, by or adjacent another of the layers. The mixer may be fluidly connected to the restrictor by a via in at least one of the layers.

In another aspect, a mixer includes an intermediate manifold channel, a plurality of primary transfer channels and a plurality of secondary transfer channels. The plurality of primary transfer channels and the plurality of secondary transfer channels are fluidly connected to the intermediate manifold channel. The fluid connection of a primary transfer channel with the intermediate manifold channel is arranged substantially opposite to the fluid connection of a corresponding secondary transfer channel.

The mixer may be configured such that a fluid flow is receivable in the intermediate manifold channel from the plurality of primary transfer channels and is deliverable by the intermediate manifold channel to the plurality of secondary transfer channels.

The primary transfer channels may have different volumes. The secondary transfer channels may have different volumes.

BRIEF DESCRIPTION OF THE DRAWINGS

The above and further advantages of this invention may be better understood by referring to the following description in conjunction with the accompanying drawings, in which like reference numerals indicate like elements and features in the various figures. Letters may be appended to reference numbers to distinguish from reference numbers for similar features and to indicate a correspondence to other features in the drawings. For clarity, not every element may be labeled in every figure. The drawings are not necessarily to scale, emphasis instead being placed upon illustrating the principles of the invention.

DETAILED DESCRIPTION

Generally, this disclosure provides a device which emulates the advantages of using a chromatographic column whilst avoiding or reducing the associated disadvantages. Some embodiments of a device disclosed herein control the dispersion and back pressure so as better to emulate a chromatographic column. The device may be repeatable and predictable in nature and further provides a back pressure load (which may be required in order for the valves to work effectively).

Generally, one aspect of the present invention provides a mixer. The mixer comprises an inlet manifold channel, an outlet manifold channel and a plurality of transfer channels fluidly connected between the inlet and outlet manifold channels. In other embodiments of the present invention, there may be provided one or more intermediate manifold channels between the inlet and outlet manifold channels, as will be described below.

Figure 1:
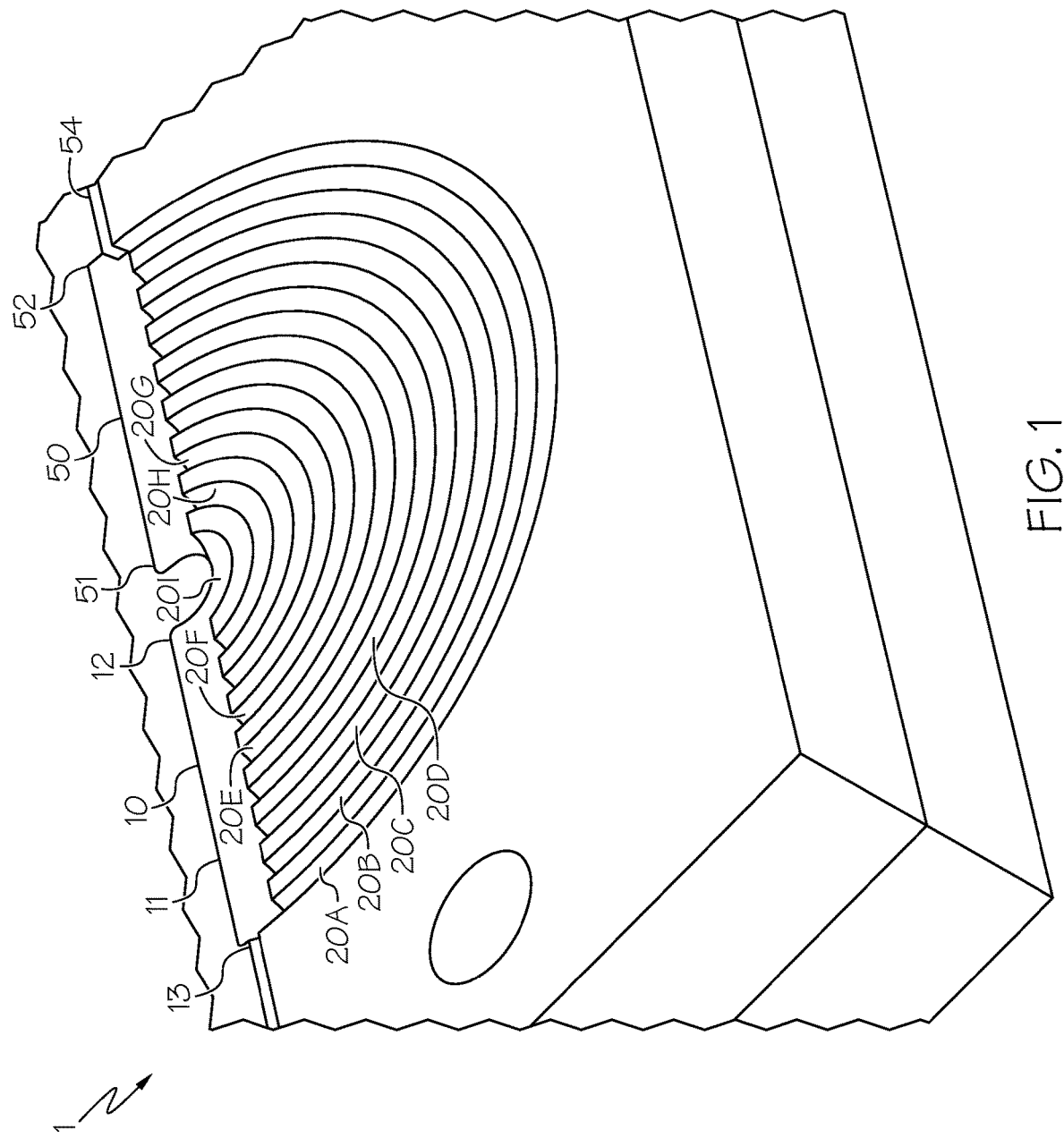
FIG. 1 schematically illustrates a mixer embodying the present invention.

FIG. 1 illustrates a mixer 1 according to one embodiment of the present invention. The mixer 1 comprises an inlet manifold channel 10 having a proximal end 11 and a distal end 12. An inlet 13 is provided at or adjacent the proximal end 11 for receiving an inlet flow. The inlet flow may be a fluid to be mixed by the mixer 1. The inlet manifold channel 10 illustrated in FIG. 1 is generally trough-shaped and may have a substantially semi-circular cross-section. This is not essential. The cross-section of the inlet manifold channel 10 may take different forms, for example square-shaped, U-shaped or V-shaped. The cross-section of the inlet manifold channel 10 may be of the same shape and dimension between the proximal end 11 and distal end 12. Alternatively, the cross-section and/or dimensions may differ between the proximal end 11 and distal end 12. For example, the cross-sectional area of the inlet manifold channel 10 may reduce from the proximal end 11 towards the distal end 12.

The mixer 1 further comprises an outlet manifold channel 50. The outlet manifold channel 50 may be broadly similar to the inlet manifold channel 10. The outlet manifold channel 50 has a proximal end 51 and a distal end 52. The cross-sectional shape and/or dimensions of the outlet manifold channel 50 may be substantially the same as that/those of the inlet manifold channel 10. In at least one embodiment, the cross-sectional area and/or dimensions of the inlet manifold channel 10 may be different to that/those of the outlet manifold channel 50. The outlet manifold channel 50 may comprise an outlet 54 at the distal end 52 for delivering an outlet flow. Preferably, the composition of the fluid being passed out of the outlet 54 may be substantially more homogenous (or less heterogeneous) than a flow entering the inlet flow 13 at the proximal end 11 of the inlet manifold channel 10.

The mixer 1 further comprises a plurality of transfer channels 20 fluidly connected between the inlet manifold channel 10 and outlet manifold channel 50. In the embodiment of the mixer 1 shown in FIG. 1, there are nine transfer channels 20, labelled 20A to 20I. There may be more or fewer channels 20.

As will be seen from FIG. 1, the respective fluid connections between the plurality of transfer channels 20A to 20I may be distributed along the length of each of the inlet manifold channel 10 and outlet manifold channel 50.

In at least one embodiment, the respective fluid connections of the plurality of transfer channels 20A to 20I are distributed substantially equally along the length of the inlet manifold channel 10 and outlet manifold channel 50.

The plurality of transfer channels 20A to 20I may extend substantially perpendicularly from the inlet manifold channel 10 and outlet manifold channel 50 at each fluid connection. That is to say, at the point of each fluid connection between the transfer channels 20A to 20I and the inlet manifold channel 10 and outlet manifold channel 50, the longitudinal axis of each transfer channel 20A to 20I at that point is perpendicular (90°) to the longitudinal axis of the inlet manifold channel 10 and outlet manifold channel 50.

The inlet manifold channel 10 and outlet manifold channel 50 may be substantially elongate and linear. This is not essential, they may take other forms, including curved.

In at least one embodiment, the plurality of transfer channels 20A to 20I may extend at a non-perpendicular angle from the inlet manifold channel 10 and outlet manifold channel 50 at each fluid connection. This may promote the transfer of fluid within the inlet manifold channel 10 into the plurality of transfer channels 20A to 20I. In another embodiment, the angle between the inlet manifold channel 10 and the fluid connection of each of the plurality of transfer channels 20A to 20I may be different. For example, the fluid connection of the first transfer channel 20A may be substantially perpendicular with the axis of the inlet manifold channel 10, whereas the angle between the ninth transfer channel 20I and the inlet manifold channel 10 may be non-perpendicular (for example 45°).

In at least one embodiment, the plurality of transfer channels 20A to 20I extend substantially within the same plane from the inlet manifold channel 10 and outlet manifold channel 50 at each fluid connection. That is to say that the longitudinal axis of the transfer channels 20A to 20I at the point of fluid connection are all within the same plane as one another. In at least one embodiment, the entire length of the plurality of transfer channels 20A to 20I are arranged in the same plane.

As will be seen from FIG. 1, the plurality of transfer channels 20A to 20I may be substantially arcuate. In at least one embodiment, the plurality of transfer channels 20A to 20I are substantially semi-circular. In at least one embodiment, the plurality of transfer channels 20A to 20I are substantially concentric with one another. In at least one embodiment, the plurality of transfer channels 20A to 20I are substantially parallel to one another.

The arrangement of the transfer channels 20A to 20I allows for the close arrangement of the transfer channels 20A to 20I on the mixer, so as to save space.

In at least one embodiment, the plurality of transfer channels 20A to 20I are each of different lengths. In at least one embodiment, there may be no two transfer channels 20A to 20I of the same length. A second transfer channel 20B may be longer than a first transfer channel 20A. A third transfer channel 20C may be longer than the second transfer channel 20B. A fourth transfer channel 20D may be longer than the third transfer channel 20C and so on. The difference in length between two adjacent transfer channels 20A to 20I may be uniform, or it may differ. With reference to FIG. 1, it will be noted that the radius of each of the arcuate transfer channels 20A to 20I increases substantially linearly. The length of each transfer channel 20A to 20I is equal to the radius multiplied by $\pi$ (because they are semi-circular). Consequently, the lengths of each of the respective transfer channels 20A to 20I may increase linearly. That is to say that the difference between the length of the first transfer channel 20A and the second transfer channel 20B may be the same as the difference between the length of the second transfer channel 20B and the third transfer channel 20C.

In other embodiments, the length of the transfer channels 20A to 20I may increase non-linearly.

FIG. 1 shows a cutaway cross-section of part of the mixer 1. The inlet manifold channel 10, the outlet manifold channel 50 and the plurality of transfer channels 20A to 20I appear to be "open" on the top. In at least one embodiment, a fluid passing through the mixer 1 is at high pressure. Accordingly, a mixer 1 embodying the present invention may be hermetically sealed.

In at least one embodiment, as will be described later, the mixer 1 may comprise a further layer on top of the layer shown in FIG. 1, which serves to close the top of the inlet manifold channel 10, the outlet manifold channel 50 and the plurality of transfer channels 20A to 20I. The underside of the layer which sits atop that shown in FIG. 1 may be planar, or it may have a corresponding inlet manifold channel, outlet manifold channel and transfer channels. Accordingly, where the inlet manifold channel 10, outlet manifold channel 50 and plurality of transfer channels 50 are substantially semi-circular, when two corresponding layers are arranged adjacent to one another, they may define substantially circular composite inlet manifold channels, outlet manifold channels and plurality of transfer channels.

In at least one embodiment, the transfer channels 20A to 20I each have different volumes. That is to say that the volume between the inlet fluid connection of a transfer channel 20A to 20I and the outlet of the transfer channel 20A to 20I is different to the corresponding volume of another transfer channel 20A to 20I. In an embodiment where all the transfer channels 20A to 20I have substantially the same cross-sectional shape and area, if the length of each of the transfer channels 20A to 20I increases linearly between the respective transfer channels 20A to 20I, so will the corresponding volume.

In at least one embodiment, the plurality of transfer channels 20A to 20I have different cross-sectional areas and/or different cross-sectional shapes. It will be appreciated that for a transfer channel of a particular length, adjusting the cross-sectional shape and/or area along at least a part of the transfer channel 20A to 20I will affect its overall volume.

In at least one embodiment, the plurality of transfer channels 20A to 20I have at least one flow restrictor arranged within at least one of the transfer channels 20A to 20I.

It will be appreciated that the longer the transfer channel 20A to 20I, the more the dynamic fluid resistance it will offer to a fluid passing therethrough. Accordingly, in at least one embodiment, one or more restrictors may be added to the path of the transfer channels 20A to 20I so as to avoid, or reduce the chances of, an incoming fluid taking the easiest (least resistant, shortest) transfer channel 20. The resistance of a transfer channel 20A to 20I can be changed by altering the cross-sectional dimensions and/or by adding a physical restrictor feature.

A benefit of the plurality of transfer channels 20A to 20I being of different lengths, volumes, cross-sectional areas, cross-sectional shapes and/or having at least one flow restrictor is that the time taken for a fluid to pass through a respective transfer channel 20A to 20A is different to that of another transfer channel 20A to 20I. Accordingly, after receiving an inlet flow at the inlet 13 at the proximal end 11 of the inlet manifold channel 10, the respective components of that inlet flow which are diverted into the transfer channels 20A to 20I will emerge from the outlet of each transfer channel 20A to 20I at different times. This arrangement serves to reduce/smooth any compositional noise which may be present in the fluid flow.

The fluid being conveyed through the transfer channels 20A to 20I is delivered to the outlet manifold channel 50. Generally, it will be noted that the delivery of the fluid from the transfer channels 20A to 20I into the outlet manifold channel 50 is effectively a reverse of the arrangement in which the fluid in the inlet manifold channel 10 is transferred into the transfer channels 20A to 20I.

The outlet manifold channel 50 may serve to combine and further mix the fluid delivered to the outlet manifold channel 50 by each of the transfer channels 20A to 20I. The fluid is then delivered out of the mixer 1 through the outlet 54 at the distal end 52 of the outlet manifold channel 50. In another embodiment, the outlet 54 may be provided at the proximal end 51 of the outlet manifold channel 50. Alternatively, the outlet 54 may be provided at a point between the proximal 51 and distal 52 ends of the outlet manifold channel 50. The same arrangement could be implemented with the inlet 13 to the inlet manifold channel 10.

The outlet manifold channel 50 may be provided with physical features on the surface of the outlet manifold channel 50 which may promote further mixing. For example, such features may comprise fins, protrusions, baffles or recesses which help to create turbulent flow within the outlet manifold channel 50. Similar features may be provided within the inlet manifold channel 10.

With the arrangement shown in FIG. 1, the proximal end 51 of the outlet manifold channel 50 is arranged substantially adjacent to the distal end 12 of the inlet manifold channel 10. In at least one embodiment, the inlet manifold channel 10 is arranged substantially co-linearly with the outlet manifold channel 50. That is to say that the longitudinal axis of the inlet manifold channel 10 is substantially co-axial with the longitudinal axis of the outlet manifold channel 50. This is not essential and is more a consequence of the fact that the transfer channels 20A to 20I in the embodiment illustrated are semi-circular.

It will be noted from FIG. 1 that the fluid connection of a first transfer channel 20A to the inlet manifold channel 10 is adjacent the proximal end 11 of the inlet manifold channel 10. The fluid connection of that first transfer channel 20A to the outlet manifold channel 50 is adjacent to the distal end 52 of the outlet manifold channel 50. Accordingly, the fluid connection of a last transfer channel 20I to the inlet manifold channel 10 is adjacent to the distal end 12 of the inlet manifold channel 10. Furthermore, the fluid connection of the last transfer channel 20I to the outlet manifold channel 50 is adjacent to the proximal end 51 of the outlet manifold channel 50.

Figure 2:
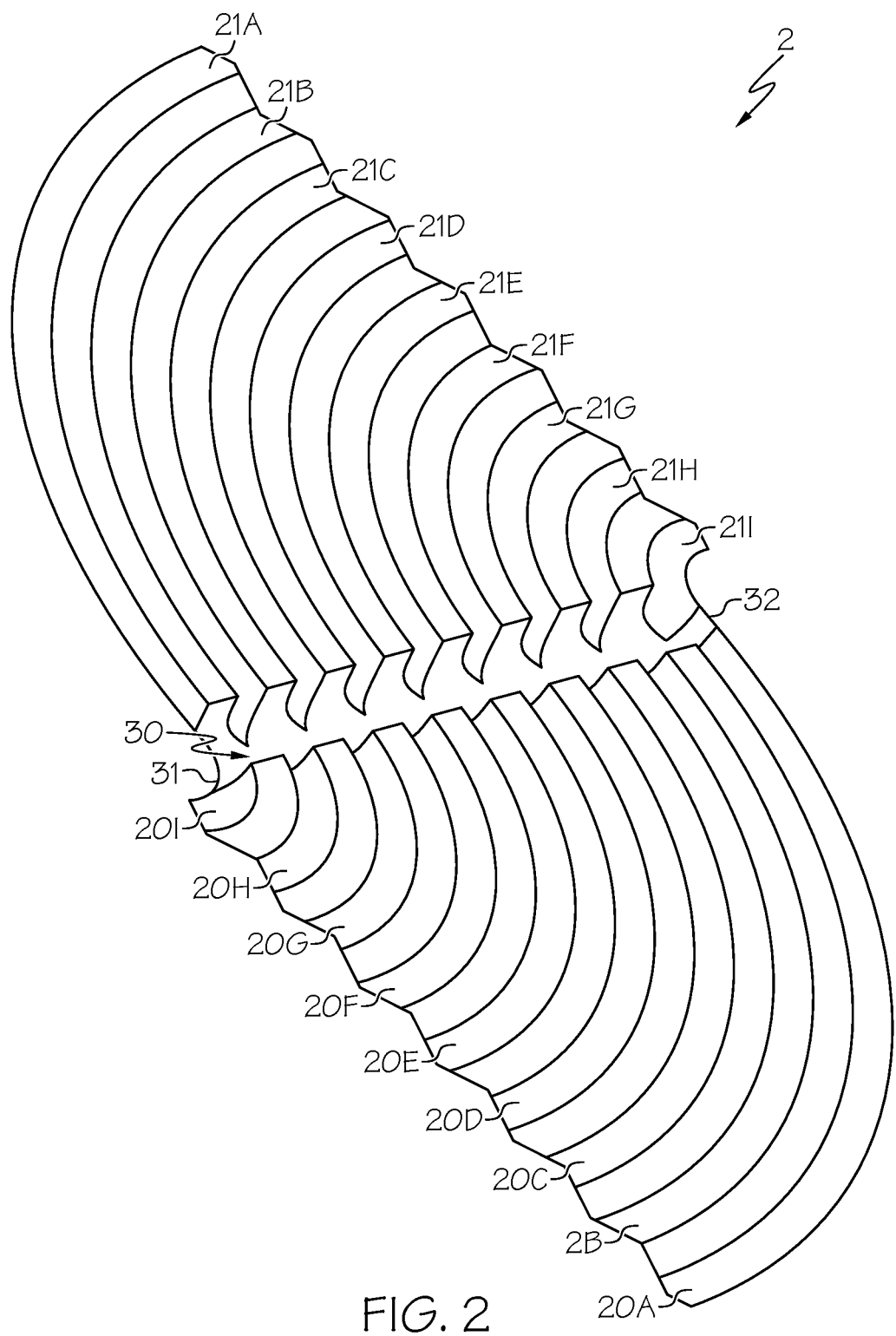
FIG. 2 schematically illustrates another mixer embodying the present invention.

Another embodiment of the present invention will now be described by reference to FIG. 2. It will be appreciated from the following description that the mixer 2 as illustrated in FIG. 2 adopts many of the same features as the mixer 1 illustrated in and described with reference to FIG. 1. FIG. 2 illustrates a mixer 2 comprising an intermediate manifold channel 30. The mixer 2 further comprises a plurality of primary transfer channels 20A to 20I fluidly connected to the intermediate manifold channel 30. The mixer 2 further comprises a plurality of secondary transfer channels 21A to 21I fluidly connected to the intermediate manifold channel 30. The fluid connection of a primary transfer channel 20A to 20I with the intermediate manifold channel 30 may be arranged substantially opposite to the fluid connection of a corresponding fluid connection of a secondary transfer channel 21A to 21I.

A fluid is delivered to the intermediate manifold channel 30 by the plurality of primary transfer channels 20A to 20I and the fluid is then passed from the intermediate manifold channel 30 into the plurality of secondary transfer channels 21A to 21I.

In at least one embodiment, the respective fluid connections of the plurality of primary transfer channels 20A to 20I and secondary transfer channels 21A to 21I are distributed substantially equally along the length of the intermediate manifold channel 30. In at least one embodiment, the respective fluid connections are distributed equally between the proximal end 31 and distal end 32 of the intermediate manifold channel 30. The spacing of the fluid connections may be the same or similar to the spacing of the fluid connections of the mixer one shown in FIG. 1.

As will be appreciated from the following description, the mixer 2 may share similar physical characteristics to the mixer 1 shown in FIG. 1. For example, the plurality of primary transfer channels 20A to 20I and secondary transfer channels 21A to 21I extend substantially perpendicularly from the intermediate manifold channel 30 at each fluid connection. In at least one embodiment, the plurality of primary transfer channels 20A to 20I extend substantially within the same plane from the intermediate manifold channel 30 at each fluid connection. In at least one embodiment, the plurality of primary transfer channels 20A to 20I and plurality of secondary transfer channels 21A to 21I are all arranged in substantially the same plane, as illustrated in FIG. 2.

In at least one embodiment, the plurality of primary transfer channels 20A to 20I and secondary transfer channels 21A to 21I are substantially arcuate.

In at least one embodiment, the plurality of primary transfer channels 20A to 20I and secondary transfer channels 21A to 21I are substantially semi-circular.

In at least one embodiment, the plurality of primary transfer channels 20A to 20I and secondary transfer channels 21A to 21I are substantially concentric with one another.

The plurality of primary transfer channels 20A to 20I and secondary transfer channels 21A to 21I are substantially parallel to one another.

As with the embodiments described with reference to the mixer 1 in FIG. 1, the plurality of primary transfer channels 20A to 20I and secondary transfer channels 21A to 21I may have different lengths, different volumes, different cross-sectional areas and/or different cross-sections.

In at least one embodiment, at least one of the pluralities of primary transfer channels 20A to 20I and secondary transfer channels 21A to 21I comprises at least one flow restrictor of the type described above in relation to the mixer 1 shown in FIG. 1.

The outlet of a primary transfer channel 20A to 20I may be substantially opposite and coaxial with the inlet of a corresponding secondary transfer channel 21A to 21I. Accordingly, when a fluid is passed from the primary transfer channel 20A to 20I into the intermediate manifold channel 30, it may be directed generally towards the inlet of the secondary transfer channel 21A to 21I.

In at least one embodiment, the outlets of the primary transfer channels 20A to 20I may be offset from the inlets of the secondary transfer channels 21A to 21I. A benefit of this arrangement may be that further mixing of the fluid within the intermediate manifold channel 30 is promoted. The fluid exiting a given primary transfer channel 20A to 20I may not necessarily then pass to a corresponding (e.g. opposite) inlet of a secondary transfer channel 21A to 21I. In at least one embodiment, although a particular portion of the fluid leaving a primary transfer channel 20A to 20I may be directed into the inlet of a corresponding opposing secondary transfer channel 21A to 21I, other parts of that fluid may be distributed though the intermediate manifold channel 30 and delivered into the inlet of other secondary transfer channels 21A to 21I.

In at least one embodiment, the volume of the intermediate manifold channel 30 may be configured so as to act as a dwell volume, in which the fluid received from the primary transfer channels 20A to 20I is mixed before being passed into the secondary transfer channels 21A to 21I.

In at least one embodiment, the fluid connections of some or all of the primary transfer channels 20A to 20I may be non-perpendicular to the longitudinal axis of the intermediate manifold channel 30.

Figure 3:
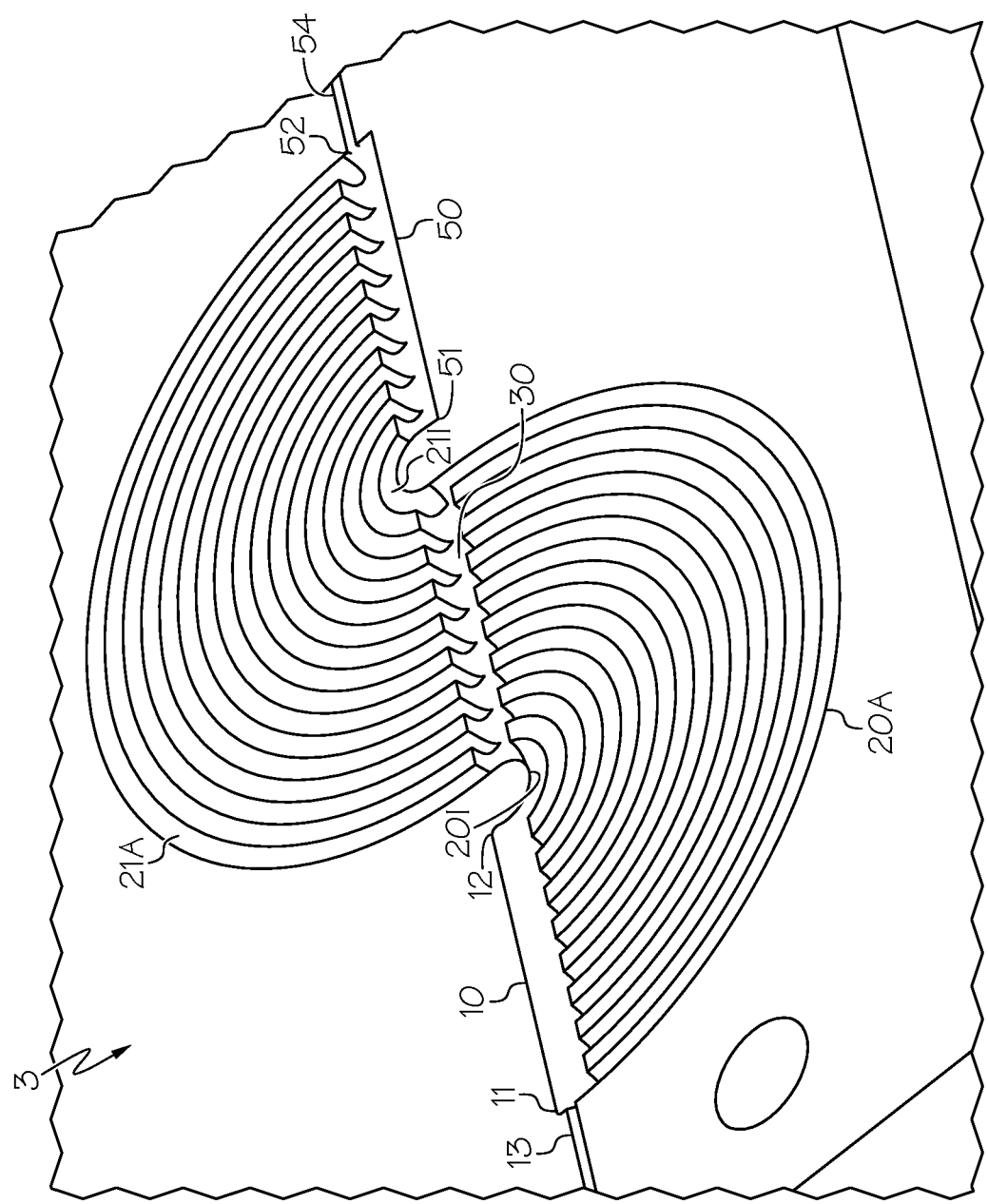
FIG. 3 schematically illustrates another mixer embodying the present invention.

FIG. 3 illustrates another mixer 3 according to another embodiment of the present invention.

The mixer 3 comprises an inlet manifold channel 10, at least one intermediate manifold channel 30 and an outlet manifold channel 50. Only one intermediate manifold channel 30 is shown in FIG. 3.

The mixer 3 comprises a plurality of primary transfer channels 20A to 20I fluidly connected between the inlet manifold channel 10 and the intermediate manifold channel 30. Furthermore, the mixer 3 comprises a plurality of secondary transfer channels 21A to 21I fluidly connected between the intermediate manifold channel 30 and the outlet manifold channel 50.

As with the mixer 1 shown in FIG. 1, the inlet manifold channel 10 has a proximal end 11 and a distal end 12. An inlet 13 is provided at the proximal end 11. Like features are denoted with like reference numerals. Also as with the mixer 1 shown in FIG. 1, the outlet manifold channel 50 has a proximal end 51 and a distal end 52, with an outlet 54 provided at the distal end 52.

The arrangement of the intermediate manifold channel 30 may substantially be the same as that of the mixer 2 shown in FIG. 2. Accordingly, all of the features and embodiments described and illustrated with respect to the mixer 2 show in FIG. 2 may apply equally to the intermediate manifold channel 30 of the mixer 3 shown in FIG. 3. Broadly speaking, the mixer 3 illustrated in FIG. 3 is a combination of the features and functionality of the mixers 1, 2 shown in FIGS. 1 and 2.

Similarly, the features and functionality of the inlet manifold channel 10 and outlet manifold channel 50 of the mixer 1 illustrated in FIG. 1 may apply equally to the inlet manifold channel 10 and outlet manifold channel 50 of the mixer 3 shown in FIG. 3. With the mixer 3 as illustrated in FIG. 3, the intermediate manifold channel 30 serves to further mix the fluid passing between the inlet manifold channel 10 and the outlet manifold channel 50. This offers significant advantages over the arrangement as shown in U.S. Pat. No. 8,511,889, described earlier, since it allows the fluid passing down one of the primary transfer channels 20A to 20I to either completely or at least partially transfer to a different secondary transfer channel 21A to 21I before reaching the outlet manifold channel 50. This serves to promote mixing of a fluid passing through the mixer 3. Effectively, the inlet manifold channel 10, the intermediate manifold channel 30 and the outlet manifold channel 50 serve together to promote the distribution and homogenous mixing of the fluid.

It will therefore be appreciated that providing more than one intermediate manifold channel 30 will further promote mixing of a fluid.

Figure 4:
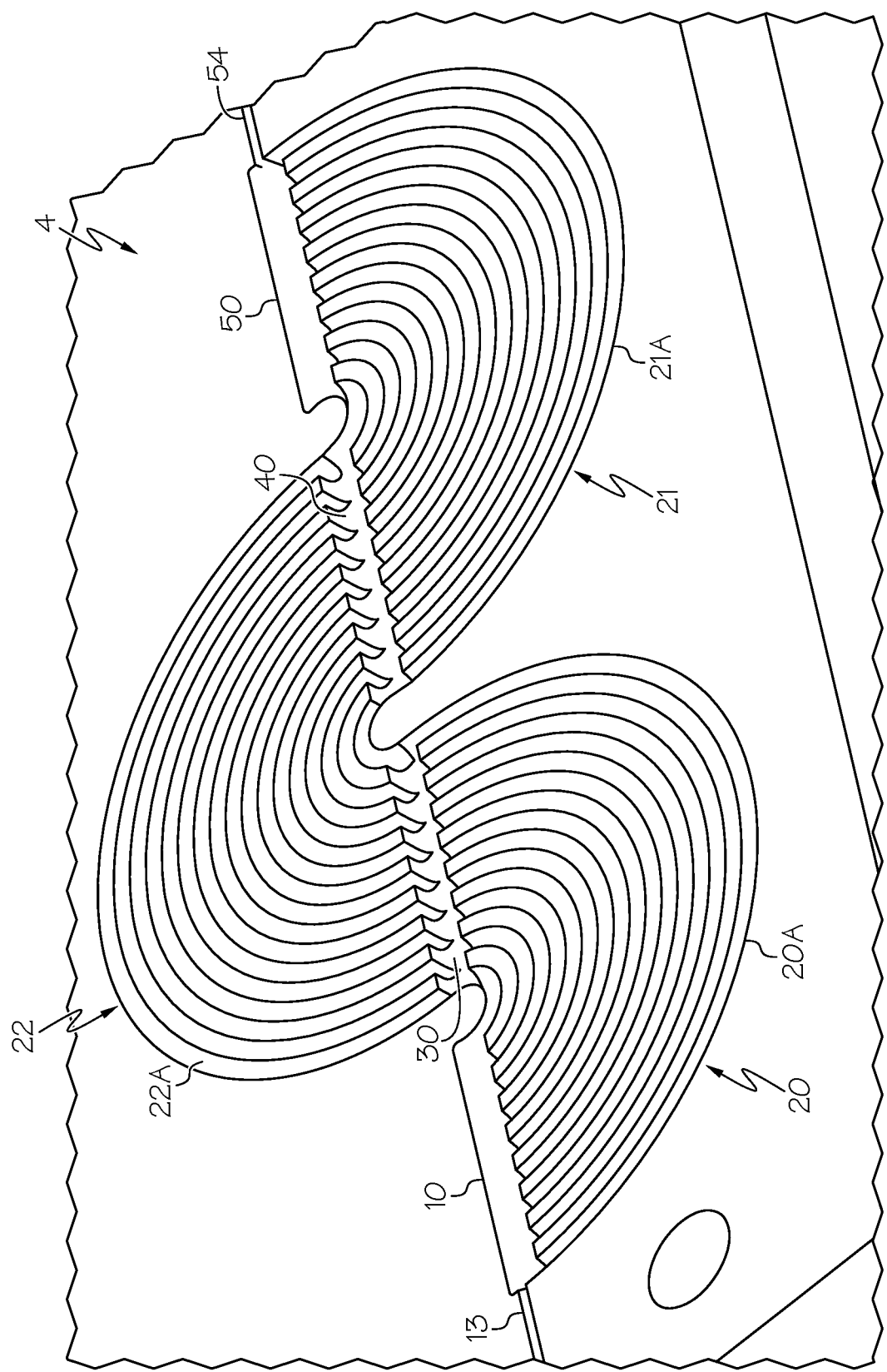
FIG. 4 schematically illustrates another mixer embodying the present invention.

FIG. 4 shows another embodiment of a mixer 4. The mixer 4 generally corresponds to the mixer 3 shown in FIG. 3, but has two (first and second) intermediate manifold channels 30, 40. A plurality of primary transfer channels 20A to 20I are fluidly connected between the inlet manifold channel 10 and the first intermediate manifold channel 30. A plurality of secondary transfer channels 21A to 21I are fluidly connected between the second intermediate manifold channel 40 and the outlet manifold channel 50. The mixer 4 further comprises a plurality of tertiary transfer channels 22A to 22I which are fluidly connected between the first intermediate manifold channel 30 and the second intermediate manifold channel 40.

The first intermediate manifold channel 30 may be substantially the same as the second intermediate manifold channel 40.

The skilled person will well appreciate that mixers embodying the present invention may comprise more than two intermediate manifold channels 30, 40. Since those will simply be a repetition and extension of the functionality and features already described, no further explanation is necessary.

With reference to FIG. 4, it will be noted that the fluid passes through three sets of transfer channels 20, 22, 21 between the inlet manifold channel 10 and the outlet manifold channel 50, via two intermediate manifold channels 30, 40.

Fluid which is conveyed through the first primary transfer channel 20A will be delivered to the first intermediate manifold channel 30 near the inlet of the first tertiary transfer channel 22A. The fluid conveyed through the first tertiary transfer channel 22A will be delivered to the second intermediate manifold channel 40 near the inlet of the first secondary transfer channel 21A. The first tertiary transfer channel 22A is shorter than the first primary transfer channel 20A. The first secondary transfer channel 21A is longer than the first primary transfer channel 20A. The first tertiary transfer channel 22A may be the same length as the first secondary transfer channel 21A. Accordingly, it will be appreciated that, as fluid passes through the transfer channels 20, 22, 21, it is generally caused to alternative between longer and shorter sections. This helps to promote mixing.

Figure 5:
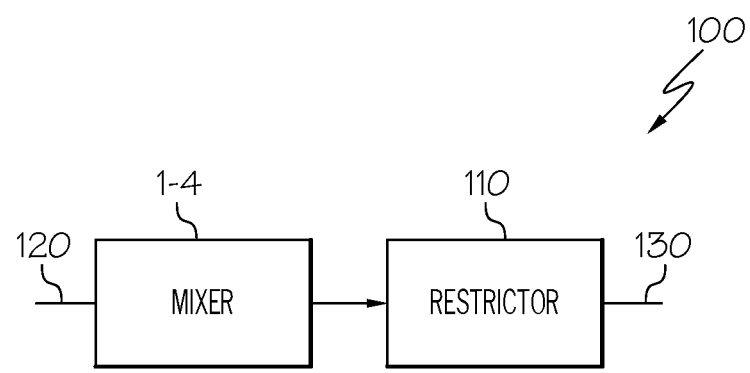
FIG. 5 schematically illustrates a calibration device embodying the present invention.

Another embodiment of the present invention provides a calibration device. The calibration device may be a microfluidic device 100 comprising a mixer 1-4 and a restrictor 110, shown schematically in FIG. 5. The mixer 1-4 is fluidly connected to the restrictor 110. The mixer may comprise any of the mixers 1-4 described and illustrated herein.

Figure 8:
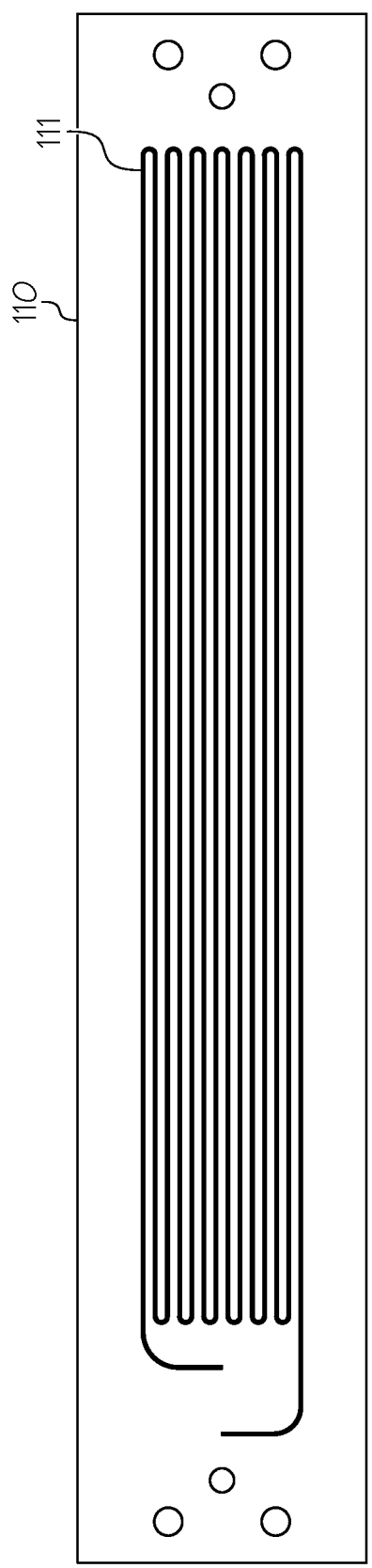
FIG. 8 schematically illustrates a restrictor of a microfluidic device embodying the present invention.

In at least one embodiment, the restrictor 110 is downstream of the mixer 1-4. As illustrated in FIG. 8, the restrictor 110 may comprise an elongate channel 111 configured to offer suitable hydraulic resistance to establish the required back pressure. The elongate channel 111 may be labyrinthine or tortuous, so that it may be provided within a relatively compact rectangular area.

The microfluidic device 100 comprises an inlet port 120 and an outlet port 130. The inlet port 120 is fluidly connected to the inlet 13 of the input manifold channel 10. The outlet port 130 is fluidly connected to an outlet of the restrictor 110. The ports 120, 130 may be provided with standard fluid fittings.

Figure 6:
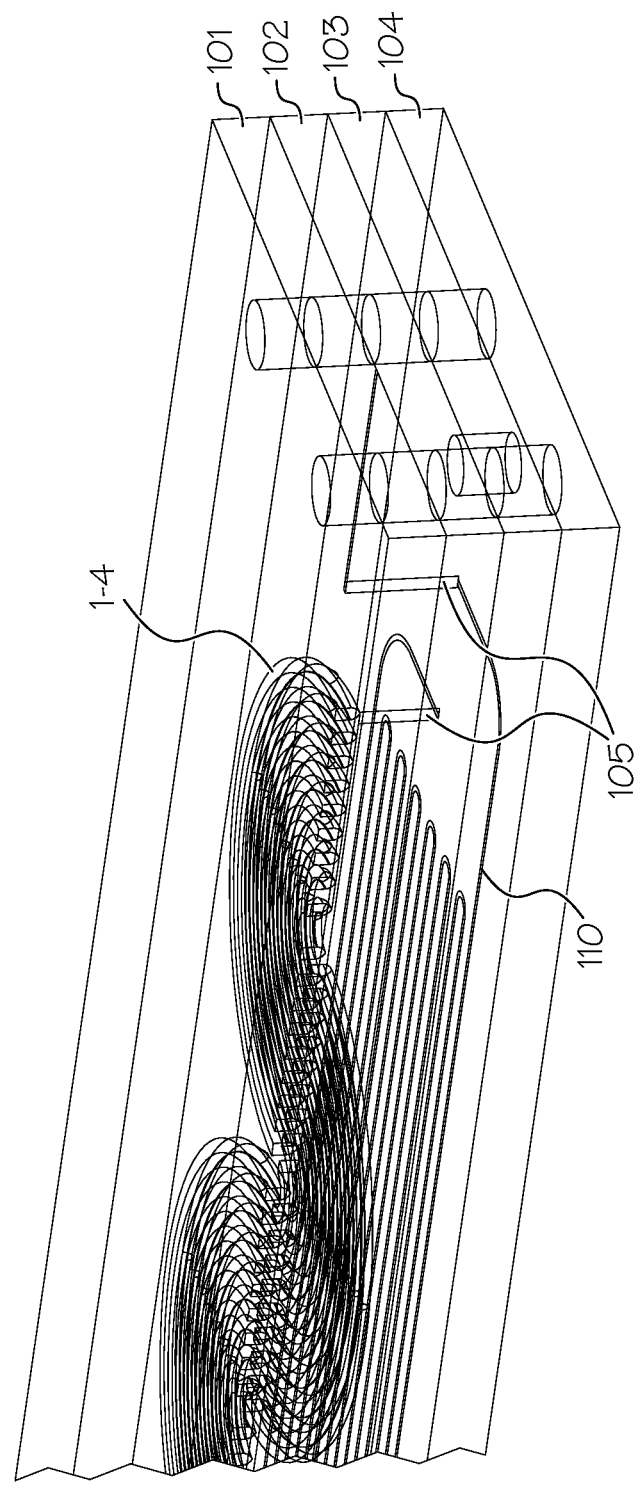
FIG. 6 schematically illustrates a cross section of a microfluidic device embodying the present invention.
Figure 7:
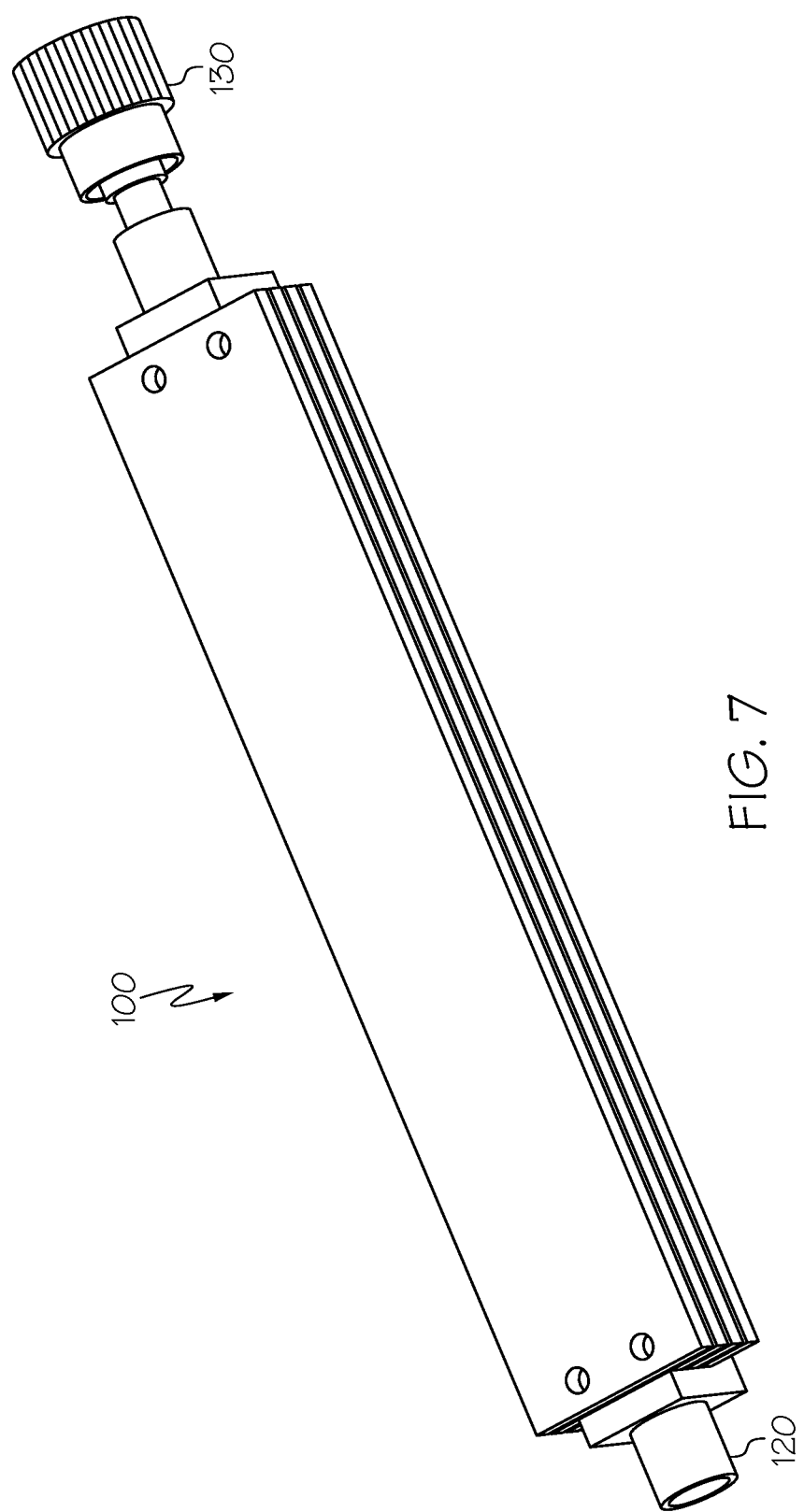
FIG. 7 schematically illustrates a microfluidic device embodying the present invention.

The microfluidic device 100 may comprise a plurality of layers 101-104, shown in FIG. 6 and, in at least one embodiment, may be provided in the form of a device shown in FIG. 7. The mixer 1-4 may be provided in, by or adjacent one of the layers 101-104, and the restrictor 110 may be provided in, by or adjacent another of the layers 101-104. Inter-layer 101-104 fluidic connections may be made by vias 105, which comprise through holes passing through the layer 101-104. The mixer 1-4 may be arranged in a plane which is generally parallel to the plane in which the restrictor 110 is arranged. This may provide a microfluidic device 100 having a relatively compact, and short, form factor, whilst providing a relatively much longer fluid path within. The length of the path taken by a fluid passing through the microfluidic device 100 may be an order of magnitude longer than the length of the microfluidic device 100.

In at least one embodiment, the layers 101-104 are comprised of titanium. The mixer 1-4, restrictor 110 and via 105 features may be machined into the surface(s) of the layers 101-104. The microfluidic device 100 may be formed by diffusion bonding a plurality of layers 101-104.

The microfluidic device 100 serves to emulate the behaviour of a chromatographic column in use and may be used to qualify chromatography apparatus.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. A mixer comprising:
   an intermediate manifold channel;
   a plurality of primary transfer channels fluidly connected to the intermediate manifold channel, each of the primary transfer channels having an inlet, and outlet and a volume that is different than a volume of each of the other primary transfer channels; and
   a plurality of secondary transfer channels fluidly connected to the intermediate manifold channel, each of the secondary transfer channels having a volume that is different from a volume of each of the other secondary transfer channels,
   wherein the fluid connection of each of the primary transfer channels with the intermediate manifold channel is arranged opposite to a fluid connection of a corresponding one of each of the secondary transfer channels and wherein the volumes of the transfer channels of at least one of the primary transfer channels and the secondary transfer channels increase linearly.

2. The mixer of claim 1, configured such that a fluid flow is receivable in the intermediate manifold channel from the plurality of primary transfer channels and is deliverable by the intermediate manifold channel to the plurality of secondary transfer channels.

3. The mixer of claim 1, wherein the respective fluid connections of the primary transfer channels are distributed substantially equally along a length of the intermediate manifold channel.

4. The mixer of claim 1, wherein the respective fluid connections of the secondary transfer channels are distributed substantially equally along a length of the intermediate manifold channel.

5. The mixer of claim 1, wherein the plurality of primary transfer channels are arranged substantially in a same plane.

6. The mixer of claim 1, wherein the plurality of primary transfer channels and the plurality of secondary transfer channels are arranged substantially in a same plane.

7. The mixer of claim 1 further comprising an inlet manifold channel to receive the fluid flow and wherein the primary transfer channels fluidly connect the inlet manifold channel to the intermediate manifold channel.

8. The mixer of claim 1 further comprising an outlet manifold channel and wherein the secondary transfer channels fluidly connect the intermediate manifold channel to the outlet manifold channel.

9. The mixer of claim 8, wherein the outlet manifold channel comprises an outlet, the mixer further comprising a restrictor fluidically coupled to the outlet of the outlet manifold channel.

10. The mixer of claim 1, wherein the mixer is formed of a plurality of layers.

11. The mixer of claim 10, wherein the layers are diffusion bonded.

12. The mixer of claim 10, wherein the layers comprise titanium.

13. A mixer comprising:
    an inlet manifold channel;
    an intermediate manifold channel;
    an outlet manifold channel;
    a plurality of primary transfer channels each fluidly connected between the inlet manifold channel and the intermediate manifold channel and each having a volume that is different from a volume of each of the other primary transfer channels; and
    a plurality of secondary transfer channels each fluidly connected between the intermediate manifold channel and the outlet manifold channel and each having a volume that is different from a volume of each of the other secondary transfer channels,
    wherein a fluid connection of each of the primary transfer channels with the intermediate manifold channel is arranged opposite to a fluid connection of a corresponding one of each of the secondary transfer channels with the intermediate manifold channel, wherein each of the primary and secondary transfer channels has a length and wherein the lengths of the transfer channels of at least one of the primary transfer channels and the secondary transfer channels increase linearly.

14. The mixer of claim 13, wherein the plurality of primary transfer channels and the plurality of secondary transfer channels are arranged in a same plane.

* * * * *